United States Patent
Chang

(10) Patent No.: US 9,134,820 B2
(45) Date of Patent: Sep. 15, 2015

(54) INDICATING UNIT, INDICATING APPARATUS AND INDICATING METHOD

(71) Applicant: Kun-Rong Chang, Hsin-Chu (TW)

(72) Inventor: Kun-Rong Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 184 days.

(21) Appl. No.: 13/628,061

(22) Filed: Sep. 27, 2012

(65) Prior Publication Data

US 2013/0249866 A1    Sep. 26, 2013

(30) Foreign Application Priority Data

Mar. 22, 2012    (CN) .......................... 2012 1 0077473

(51) Int. Cl.
G06F 3/0354    (2013.01)
G06F 3/042    (2006.01)

(52) U.S. Cl.
CPC .......... G06F 3/03545 (2013.01); G06F 3/0425 (2013.01)

(58) Field of Classification Search
CPC ........................... G06F 3/03545; G06F 3/0425
See application file for complete search history.

(56) References Cited

U.S. PATENT DOCUMENTS

| | | | |
|---|---|---|---|
| 6,717,073 B2 | 4/2004 | Xu et al. | |
| 7,703,926 B2 | 4/2010 | Hong et al. | |
| 2006/0198637 A1* | 9/2006 | Lin | 398/106 |
| 2009/0227888 A1* | 9/2009 | Salmi et al. | 600/534 |
| 2010/0164434 A1* | 7/2010 | Cacioppo et al. | 320/115 |
| 2011/0169746 A1* | 7/2011 | Kitajima | 345/173 |
| 2011/0169778 A1 | 7/2011 | Nungester et al. | |
| 2012/0139907 A1* | 6/2012 | Lee et al. | 345/419 |
| 2013/0033454 A1* | 2/2013 | Luo et al. | 345/175 |
| 2014/0002422 A1* | 1/2014 | Stern et al. | 345/179 |

OTHER PUBLICATIONS

"CCD vs. CMOS: Facts and Fiction" by Dave Litwiller, Reprinted from the Jan. 2001 issue of Photonics Spectra.*

* cited by examiner

*Primary Examiner* — Aneeta Yodichkas
(74) *Attorney, Agent, or Firm* — Jianq Chyun IP Office

(57) ABSTRACT

The invention provides an indicating apparatus used in a projection system. The projection system projects a projected image on a projection surface. The indicating apparatus includes an indicating unit and an infrared receiving module. The indicating unit includes a first component, a second component and an infrared transmitting module. The infrared transmitting module is used to transmit a first infrared signal and a second infrared signal. When the indicating unit touches a touch position on the projection surface, the infrared transmitting module transmits the first infrared signal and the second infrared signal respectively through the first component and the second component. The infrared receiving module receives at least one of the first infrared signal and the second infrared signal. Moreover, the invention provides an indicating method and the indicating unit.

10 Claims, 5 Drawing Sheets

```
┌─────────────────────────────────────────────┐
│ Providing an indicating unit for transmitting a first │
│ infrared signal and a second infrared signal, wherein │
│ the first infrared signal and the second infrared signal │
│ are respectively transmitted by a first component  │─ S501
│ and a second component of the indicating unit when │
│ the indicating unit touches a touch position on a │
│ projection surface                          │
└─────────────────────────────────────────────┘
                       │
                       ▼
┌─────────────────────────────────────────────┐
│ Providing an infrared receiving module for receiving │
│ at least one of the first infrared signal and the  │─ S503
│ second infrared signal                      │
└─────────────────────────────────────────────┘
```

FIG. 5

INDICATING UNIT, INDICATING APPARATUS AND INDICATING METHOD

CROSS-REFERENCE TO RELATED APPLICATION

This application claims the priority benefit of China application serial no. 201210077473.2, filed on Mar. 22, 2012. The entirety of the above-mentioned patent application is hereby incorporated by reference herein and made a part of this specification.

BACKGROUND OF THE INVENTION

1. Field of the Invention

The invention relates to a projection technique, and more particularly, to an indicating unit, an indicating apparatus, and an indicating method for deducing a touch position in a projection system.

2. Description of Related Art

Recently, the related projection applications became more and more popular depending on development of projection technique.

In a conventional projection system, an infrared indicator is used to actuate an infrared light emitting diode to emit an infrared light when the infrared indicator contacts with a screen. Then, an infrared receiving module receives the infrared light and deduces a touch position on a projection surface. However, when a user holds the indicator, the infrared light is blocked by a hand of the user at some angles, which causes the infrared receiving module located behind the user being unable to receive the infrared light. For example, the indicator is used to draw lines and the lines are not continued. Therefore, regarding the use of indicators, users have to pay attention to the holding angle at all times. Consequently, the current techniques for the use of indicators are rather inconvenient for users.

U.S. Pat. No. 6,717,073, U.S. Pat. No. 7,703,926, and U.S. Patent Publication No. 20110169778 all disclose that an indicator is applied in a projection system. However, the indicators provided by the foregoing prior art still remain great inconvenient for use.

SUMMARY OF THE INVENTION

Accordingly, the invention is directed to an indicating unit, an indicating apparatus, and an indicating method to be able to provide a precise and complete indicating result to improve the operation convenience for users.

An embodiment of the invention provides an indicating apparatus, and the indicating apparatus is used in a projection system. The projection system projects a projected image on a projection surface. The indicating apparatus includes an indicating unit and an infrared receiving module. The indicating unit has a first component and a second component. The indicating unit includes an infrared transmitting module. The infrared transmitting module is used to transmit a first infrared signal and a second infrared signal, wherein the infrared transmitting module transmits the first infrared signal and the second infrared signal respectively through the first component and the second component when the indicating unit touches a touch position on the projection surface. The infrared receiving module is used to receive at least one of the first infrared signal and the second infrared signal.

In the above embodiment of the invention, the infrared receiving module receives the second infrared signal when the first infrared signal is blocked.

In the above embodiment of the invention, the infrared receiving module and the projection surface are separated.

In the above embodiment of the invention, the infrared receiving module includes a first infrared filter and a second infrared filter. The first infrared signal and the second infrared signal are filtered through the first infrared filter and the second infrared filter respectively.

In the above embodiment of the invention, the infrared receiving module is a charge coupled device (CCD) imaging sensor or a complementary metal oxide semiconductor (CMOS) imaging sensor.

Another embodiment of the invention provides an indicating unit, and the indicating unit is used in a projection system. The projection system projects a projected image on a projection surface. The indicating unit includes an infrared transmitting module. The infrared transmitting module is used to transmit a first infrared signal and a second infrared signal. The infrared transmitting module transmits the first infrared signal and the second infrared signal respectively through a first component and a second component of the indicating unit when the indicating unit touches a touch position on the projection surface.

In the above embodiment of the invention, the first component and the second component are located at two opposite ends of the indicating unit.

In the above embodiment of the invention, the first component touches the touch position and the second component is separated from the touch position.

In the above embodiment of the invention, the infrared transmitting module continuously transmits the first infrared signal, and the infrared transmitting module periodically transmits the second infrared signal.

Another embodiment of the invention provides an indicating method, and the indicating method is used in a projection system. The projection system projects a projected image on a projection surface. The indicating method includes: providing an indicating unit for transmitting a first infrared signal and a second infrared signal, wherein the first infrared signal and the second infrared signal are respectively transmitted by a first component and a second component of the indicating unit when the indicating unit touches a touch position on the projection surface; and providing an infrared receiving module for receiving at least one of the first infrared signal and the second infrared signal.

In the above embodiment of the invention, the step of the first infrared signal and the second infrared signal being transmitted by the indicating unit includes: receiving the second infrared signal by the infrared receiving module when the first infrared signal is blocked.

In the above embodiment of the invention, the step of the first infrared signal and the second infrared signal being transmitted by the indicating unit includes: transmitting the first infrared signal by the infrared transmitting module continuously, and transmitting the second infrared signal by the infrared transmitting module periodically.

In the above embodiment of the invention, a wavelength of the first infrared signal is substantially different from a wavelength of the second infrared signal.

Based on the above, in the above embodiments of the invention, the indicating apparatus includes the indicating unit and the infrared receiving module. In addition, the above embodiments of the invention disclose that the indicating unit respectively transmits two infrared signals, and the infrared receiving module may receive the unblocked infrared signal when one of the two infrared signals is blocked, thereby the touch position may be deduced or detected. Accordingly, the issue on the blocked infrared signal transmitted from the indicating unit may be solved effectively.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a flow chart of an indicating method according to an embodiment of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
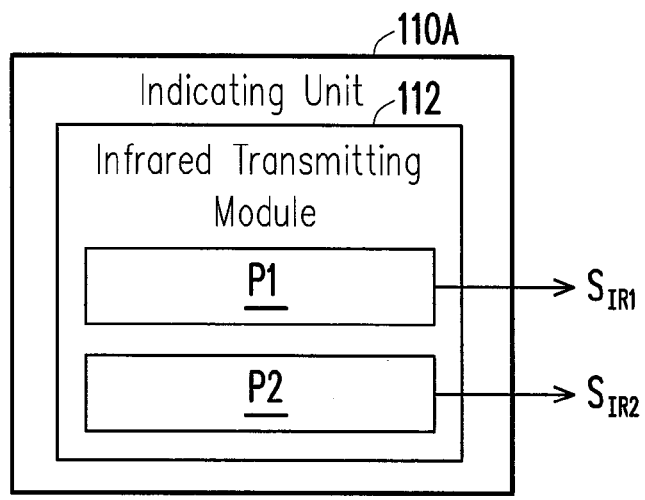
FIG. 1A is a schematic diagram of an indicating unit according to an embodiment of the invention.

Referring to FIG. 1A, an indicating unit 110A of the embodiment has a first component P1 and a second component P2, and includes an infrared transmitting module 112. The infrared transmitting module 112 may transmit a first infrared signal $S_{IR1}$ and a second infrared signal $S_{IR2}$ respectively through the first component P1 and the second component P2.

Figure 1B:
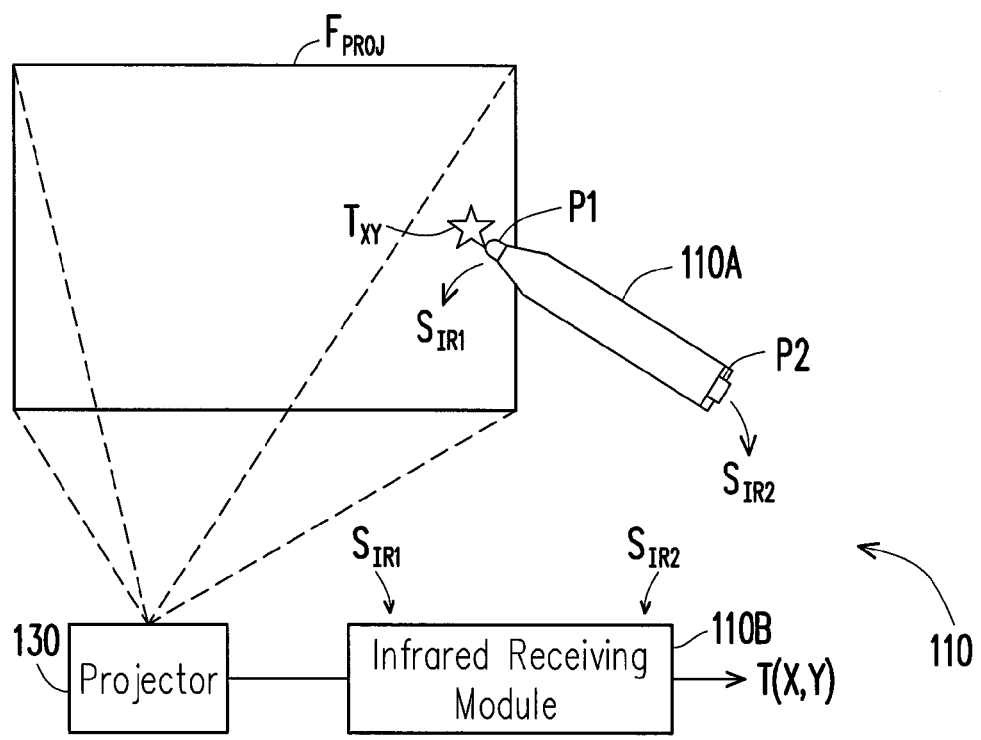
FIG. 1B is a schematic diagram of a projection system according to an embodiment of the invention.

On the basis of the above description, the indicating unit 110A of the embodiment may be applied in a projection system 100 as shown in FIG. 1B. Referring to FIG. 1B, the projection system 100 of the embodiment projects a projected image (not shown) on a projection surface $F_{PROJ}$. When the indicating unit 110A touches the projection surface $F_{PROJ}$, the infrared transmitting module 112 may transmit the first infrared signal $S_{IR1}$ and the second infrared signal $S_{IR2}$ respectively through the first component P1 and the second component P2. In the embodiment, the indicating unit 110A is included in an indicating apparatus 110, and the indicating apparatus 110 further includes an infrared receiving module 110B.

Figure 2A:
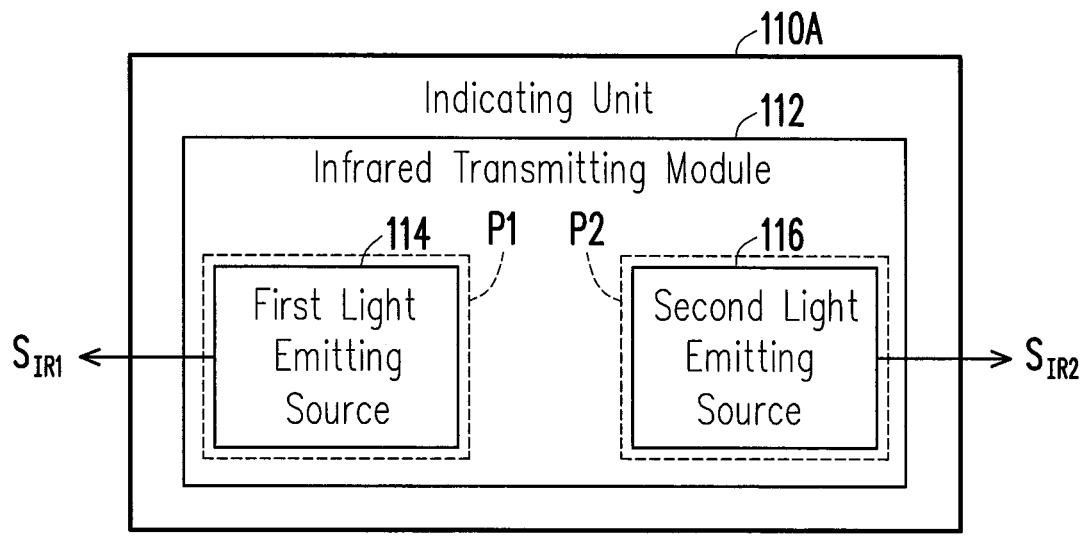
FIG. 2A is a schematic diagram of an indicating unit according to another embodiment of the invention.
Figure 2B:
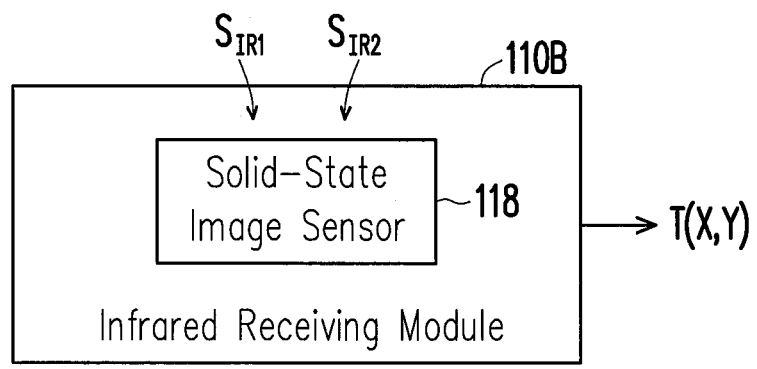
FIG. 2B is a schematic diagram of an infrared receiving module according to an embodiment of the invention.

FIG. 2A illustrates another embodiment of an indicating unit, and FIG. 2B illustrates an embodiment of an infrared receiving module shown in FIG. 1B. Referring to FIG. 1B, FIG. 2A and FIG. 2B, in the embodiment, the indicating unit 110A may design into, for example, the form of light pen. The first component P1 and the second component P2 are located at, for example, two opposite ends of the indicating unit 110A. The first component P1 contacts with the touch position $T_{XY}$, and the second component P2 is away from the touch position $T_{XY}$. The infrared transmitting module 112 may be achieved through configuring a first light emitting source 114 and a second light emitting source 116. The first light emitting source 114 and the second light emitting source 116 may transmit invisible light, and the wavelength of the invisible light is approximately between 700 nanometers (nm) and 1 millimeters (mm). More specifically, the first light emitting source 114 of the embodiment transmits the first infrared signal $S_{IR1}$ through the first component P1 of the pen tip, and the second light emitting source 116 transmits the second infrared signal $S_{IR2}$ through the second component P2 of the pen tail. On the other hand, the infrared receiving module 110B of the embodiment may receive at least one of the first infrared signal $S_{IR1}$ and the second infrared signal $S_{IR2}$ from the indicating unit 110A, wherein the infrared receiving module 110B and the projection surface $F_{PROJ}$ may be separated from each other, like the infrared receiving module 110B in FIG. 1A is disposed outside the projection surface $F_{PROJ}$.

In the embodiment, when the indicating unit 110A touches the projection surface $F_{PROJ}$, the infrared transmitting module 112 transmits the second infrared signal $S_{IR2}$ through the second component P2 located at the pen tail, so the infrared transmitting module 112 is not blocked by a hand of the user during writing. When the first infrared signal $S_{IR1}$ is blocked, the infrared receiving module 110B may receive the second infrared signal $S_{IR2}$. In the light of the first infrared signal $S_{IR1}$ and the second infrared signal $S_{IR2}$, the coordinates T(X,Y) of the touch position $T_{XY}$ may be deduced or detected. Hence, when a user uses the indicating unit 110A to perform writing through the first infrared signal $S_{IR1}$ and/or the second infrared signal $S_{IR2}$, lines of the writing paths may be obtained and not disconnected, and the writing path may remain continuous.

In the embodiment, the infrared receiving module 110B may be electronically connected with a projector 130, wherein the infrared receiving module 110B is disposed outside the projector 130 and includes at least a solid-state image sensor 118. The solid-state image sensor 118 may be a charge coupled device (CCD) image sensor or a complementary metal oxide semiconductor (CMOS) image sensor, but the embodiment of the invention is not be construed as limited herein. However, in other embodiments, the infrared receiving module 110B may also be built-in within the projector 130.

The following embodiments are performed with different infrared wavelengths or the same infrared wavelength to illustrate other possible embodiments in different forms of the invention set forth.

Figure 3A:
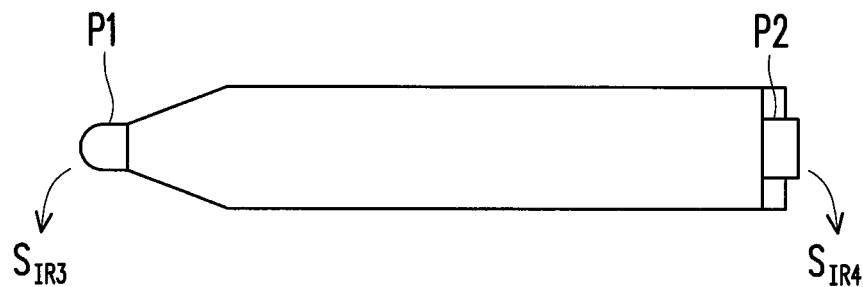
FIG. 3A is a diagram of an indicating unit according to an embodiment of the invention.
Figure 3B:
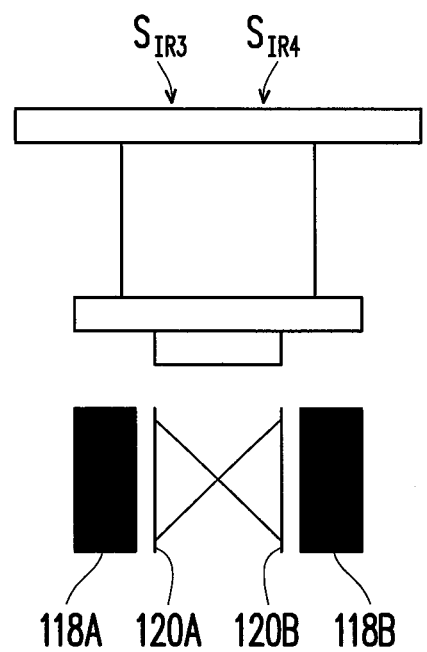
FIG. 3B is a diagram of an infrared receiving module according to an embodiment of the invention.

Referring to FIG. 3A and FIG. 3B simultaneously. In the embodiment, the indicating unit 310A may transmit the first infrared signal $S_{IR3}$ through the first component P1 located at an end part of the pen tip, and transmit the second infrared signal $S_{IR4}$ through the second component P2 located at another end part opposite the first component P1 of the indicating unit 310A. The indicating unit 310A, for example, continuously transmits the first infrared signal $S_{IR3}$ and the second infrared signal $S_{IR4}$, wherein the wavelengths of the first infrared signal $S_{IR3}$ and the second infrared signal $S_{IR4}$ are respectively 850 nm and 940 nm, but these wavelengths of the infrared signals are not be construed as limited herein. Accordingly, two solid-state image sensors 118A, 118B and two infrared filters 120A, 120B may be disposed in the infrared receiving module 310B, wherein the infrared receiving module 310B is used to correspondingly receive the infrared signals transmitted from the indicating unit 310A. The first infrared signal $S_{IR3}$ is filtered through the infrared filter 120A, and the first infrared signal $S_{IR3}$ is received by the solid-state image sensor 118A. Similarly, the second infrared signal $S_{IR4}$ is filtered through the infrared filter 120B, and the second infrared signal $S_{IR4}$ is received by the solid-state image sensor 118B.

Figure 4A:
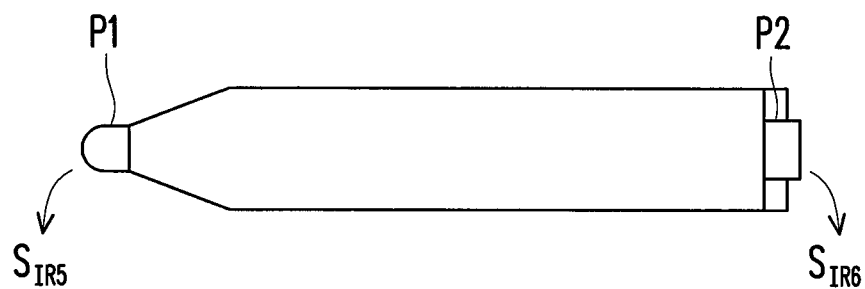
FIG. 4A is a diagram of an indicating unit according to another embodiment of the invention.
Figure 4B:
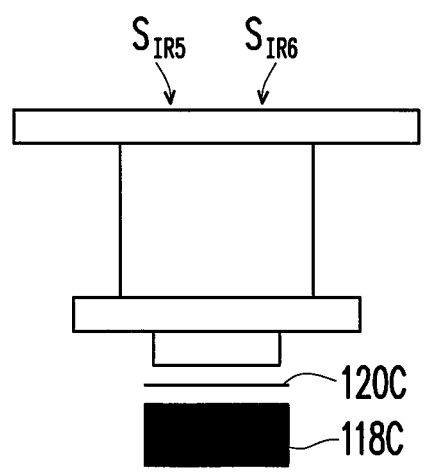
FIG. 4B is a diagram of an infrared receiving module according to another embodiment of the invention.

Referring to FIG. 4A and FIG. 4B simultaneously. In the embodiment, the indicating unit 410A may transmit the first infrared signal $S_{IR5}$ through the first component P1, and transmit the second infrared signal $S_{IR6}$ through the second component P2, wherein the indicating unit 410A, for example, continuously transmits the first infrared signal $S_{IR5}$, and the indicating unit 410A, for example, periodically transmits the second infrared signal $S_{IR6}$. The above periodically transmitting operation is performed by the method of interval time, and the invention is not limited by the interval time; that is, the period may be modulated with time, and may also be fixed. In addition, the wavelengths of the first infrared signal $S_{IR5}$ and the second infrared signal $S_{IR6}$ may be identical such as both are 850 nm, but the wavelengths are not be construed as limited herein; that is, the wavelength may depend on the product requirements to modify. For example, the first infrared signal $S_{IR5}$ and the second infrared signal $S_{IR6}$ may also both be 940 nm or other suitable bands. Accordingly, a solid-state image sensor 118C and an infrared filter 120C may be disposed in the infrared receiving module 410B, wherein the infrared receiving module 410B is used to correspondingly receive the infrared signals transmitted from the indicating unit 410A. The first infrared signal $S_{IR5}$ and the second infrared signal $S_{IR6}$ are filtered through the infrared filter 120C, and the first infrared signal $S_{IR5}$ and the second infrared signal $S_{IR6}$ are received by the solid-state image sensor 118C. Hence, the infrared receiving module 410B may process the first infrared signal $S_{IR5}$ and the second infrared signal $S_{IR6}$ according to the wavelengths at/within different light emitting times. However, in other embodiments, the first infrared signal $S_{IR5}$ and the second infrared signal $S_{IR6}$ may also respectively have different wavelengths, and the infrared receiving module may adopt the concept in FIG. 3B.

The above description may clearly illustrate that the use and the application of the embodiments may effectively solve the issue on the blocked infrared light transmitted from the indicating unit.

On the basis of the above embodiments, a general indicating method may be compiled. More specifically, referring to FIG. 1A and FIG. 5, the indicating method of the embodiment is used in a projection system 100, and the projection system 100 projects a projected image on a projection surface $F_{PROJ}$. The indicating method may include the following steps:

In step S501, providing an indicating unit for transmitting a first infrared signal and a second infrared signal, wherein the first infrared signal and the second infrared signal are respectively transmitted by a first component and a second component of the indicating unit when the indicating unit touches a touch position on a projection surface.

Subsequently, in step S503, providing an infrared receiving module for receiving at least one of the first infrared signal and the second infrared signal.

However, the indicating method of the indicating unit has been described as that of the indicating units 110A, 310A, and 410A in the foregoing embodiments. Thus, detailed description thereof will be omitted.

In summary, embodiments of the invention have at least one of the following advantages. In the embodiments of the invention, the indicating apparatus has the indicating unit and the infrared receiving module. In addition, the embodiments of the invention may transmit two infrared signals through the unique design of the indicating unit. When one of the two infrared signals is blocked, the infrared receiving module may receive the unblocked infrared signal, thereby the touch position may be deduced. Therefore, the indicating unit in the embodiments of the invention may effectively solve the issue on the blocked infrared signal.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Other various modifications and variations to the claims and the description of the invention, in addition to those described herein, will be apparent to those of ordinary skill in the art from the foregoing description and accompanying drawings. Thus, such other modifications and variations are intended to fall within the scope of the invention. Moreover, any one of the embodiments or claims of the invention is not required to reach all the purposes, advantages or features disclosed in the invention. In addition, the abstract and the title of the disclosure are provided to allow searchers to quickly ascertain the subject matter of the technical disclosure of any patent issued from this invention. It is submitted with the understanding that it will not be used to interpret or limit the scope or meaning of the claims in the invention. Moreover, these claims may refer to use "first", "second", etc. following with noun or element. Such terms should be understood as a nomenclature and should not be construed as giving the limitation on the number of the elements modified by such nomenclature unless specific number has been given. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An indicating apparatus, used in a projection system for projecting a projected image on a projection surface, the indicating apparatus comprising:

an indicating unit, comprising a first component and a second component located at two opposite ends thereof, and an infrared transmitting module, wherein the infrared transmitting module transmits a first infrared signal and a second infrared signal, and the infrared transmitting module transmits the first infrared signal and the second infrared signal respectively through the first component and the second component when the indicating unit touches on the projection surface, wherein the infrared transmitting module continuously transmits the first infrared signal and the infrared transmitting module periodically transmits the second infrared signal; and an infrared receiving module, receiving at least one of the first infrared signal and the second infrared signal, wherein the infrared receiving module receives one of the first infrared signal and the second infrared signal for deducing a touch position when the other one of the first infrared signal and the second infrared signal is blocked, wherein the infrared receiving module and the projection surface are separated, and the infrared receiving module is disposed outside of the projection surface.

2. The indicating apparatus as claimed in claim 1, wherein the first component touches the touch position on the projection surface and the second component is separated from the touch position.

3. The indicating apparatus as claimed in claim 1, wherein a wavelength of the first infrared signal is different from a wavelength of the second infrared signal.

4. The indicating apparatus as claimed in claim 3, wherein the infrared receiving module comprises:
 a first infrared filter, the first infrared signal is filtered through the first infrared filter; and
 a second infrared filter, the second infrared signal is filtered through the second infrared filter.

5. The indicating apparatus as claimed in claim 1, wherein the infrared receiving module is a charge coupled device image sensor or a complementary metal oxide semiconductor image sensor.

6. An indicating method, used in a projection system for projecting a projected image on a projection surface, the indicating method comprising:
 providing an indicating unit for transmitting a first infrared signal and a second infrared signal, wherein the first infrared signal and the second infrared signal are respectively transmitted by a first component and a second component located at two opposite ends of the indicating unit when the indicating unit touches on the projection surface, wherein the step of the first infrared signal and the second infrared signal being transmitted by the indicating unit comprises transmitting the first infrared signal by an infrared transmitting module continuously and transmitting the second infrared signal by the infrared transmitting module periodically; and
 providing an infrared receiving module for receiving at least one of the first infrared signal and the second infrared signal, wherein the infrared receiving module receives one of the first infrared signal and the second infrared signal for deducing a touch position when the other one of the first infrared signal and the second infrared signal is blocked, wherein the infrared receiving module and the projection surface are separated, and the infrared receiving module is disposed outside of the projection surface.

7. The indicating method as claimed in claim 6, wherein a wavelength of the first infrared signal is different from a wavelength of the second infrared signal.

8. An indicating unit, used in a projection system for projecting a projected image on a projection surface, the indicating unit comprising:
 an infrared transmitting module, transmitting a first infrared signal and a second infrared signal;
 wherein the infrared transmitting module transmits the first infrared signal and the second infrared signal respectively through a first component and a second component located at two opposite ends of the indicating unit when the indicating unit touches on the projection surface, wherein one of the first infrared signal and the second infrared signal is received by an infrared receiving module for deducing a touch position when the other one of the first infrared signal and the second infrared signal is blocked, wherein the infrared receiving module and the projection surface are separated, and the infrared receiving module is disposed outside of the projection surface, wherein the infrared transmitting module continuously transmits the first infrared signal and the infrared transmitting module periodically transmits the second infrared signal.

9. The indicating unit as claimed in claim 8, wherein the first component touches the touch position and the second component is separated from the touch position.

10. The indicating unit as claimed in claim 8, wherein a wavelength of the first infrared signal is different from a wavelength of the second infrared signal.

\* \* \* \* \*